(12) United States Patent
Vogt et al.

(10) Patent No.: US 11,413,691 B2
(45) Date of Patent: *Aug. 16, 2022

(54) LEVELLING APPARATUS FOR GANG SAWS

(71) Applicant: Precision Guide Machinery and Repair Limited, Prince George (CA)

(72) Inventors: Nalynd Vogt, Prince George (CA); Carrick Bergen, Prince George (CA)

(73) Assignee: Precision Guide Machinery and Repair Limited, Prince George (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/099,871

(22) Filed: Nov. 17, 2020

(65) Prior Publication Data

US 2021/0069806 A1 Mar. 11, 2021

Related U.S. Application Data

(63) Continuation of application No. 16/632,977, filed as application No. PCT/CA2018/051084 on Sep. 6, 2018, now Pat. No. 10,843,280.

(30) Foreign Application Priority Data

Sep. 6, 2017 (WO) ................ PCT/CA2017/051042

(51) Int. Cl.
  *B23D 47/02* (2006.01)
  *B27B 5/34* (2006.01)
  *B23D 45/10* (2006.01)

(52) U.S. Cl.
  CPC ................ *B23D 47/02* (2013.01); *B27B 5/34* (2013.01); *B23D 45/105* (2013.01)

(58) Field of Classification Search
  CPC ........ B23D 47/02; B23D 45/105; B27B 5/34; B27B 5/30; B60G 2200/4622

(Continued)

(56) References Cited

U.S. PATENT DOCUMENTS 776,971 A * 12/1904 Walsh ................ F16L 27/0849
  285/184
4,684,150 A * 8/1987 Specktor ................ B62D 17/00
  280/86.753

(Continued)

FOREIGN PATENT DOCUMENTS

CA 2817073 7/2012

OTHER PUBLICATIONS

International Search Report and Written Opinion issued in PCT/CA2018/051084 dated Jan. 9, 2019 (7 pages).

*Primary Examiner* — Nhat Chieu Q Do
(74) *Attorney, Agent, or Firm* — ARC IP Law, PC; Joseph J. Mayo

(57) ABSTRACT

A levelling apparatus for use in gang saws comprises first and second wedge portions. The first wedge portion comprises upper and lower surfaces, wherein the lower surface is nonparallel to the upper surface. The first wedge portion further comprises a plurality of openings for accepting mounting fasteners. The openings are arranged in a spaced, circular pattern about a centre of the first wedge portion. The second wedge portion also comprises upper and lower surfaces, wherein the upper surface is nonparallel to the lower surface. The second wedge portion further also comprises a plurality of openings for accepting the mounting fasteners. The second wedge openings correspond to the first wedge openings. Rotation of the first wedge portion with respect to the second wedge portion varies an angle between the first wedge upper surface and the second wedge lower surface, thereby allowing for angular adjustment.

19 Claims, 5 Drawing Sheets

(58) Field of Classification Search
USPC ......... 280/86.753; 83/425; 248/180.1, 181.1,
248/181.2, 188.1, 188.2, 188.3
See application file for complete search history.

(56) References Cited

U.S. PATENT DOCUMENTS

| | | | | |
|---|---|---|---|---|
| 4,872,699 | A * | 10/1989 | Grove | B62D 17/00 |
| | | | | 280/86.753 |
| 4,921,271 | A | 5/1990 | Berry et al. | |
| 5,383,678 | A | 1/1995 | Sokol | |
| 5,622,378 | A * | 4/1997 | Schlosser | B62D 17/00 |
| | | | | 280/86.753 |
| RE36,058 | E * | 1/1999 | Sokol | B62D 17/00 |
| | | | | 280/86.753 |
| 6,036,205 | A * | 3/2000 | Schlosser | B62D 17/00 |
| | | | | 280/86.751 |
| 6,374,665 | B1 | 4/2002 | Somppi et al. | |
| 6,431,659 | B1 | 8/2002 | Somppi | |
| 8,479,829 | B2 * | 7/2013 | Stachowiak | F16L 23/003 |
| | | | | 166/379 |
| 8,918,974 | B2 * | 12/2014 | Merrill | B60B 35/04 |
| | | | | 301/124.1 |
| 9,199,320 | B2 | 12/2015 | Stroud | |

* cited by examiner

LEVELLING APPARATUS FOR GANG SAWS

This application is a continuation of U.S. application Ser. No. 16/632,977, filed 24 Nov. 2020, which is a U.S. National Phase application of International Application No. PCT/CA2018/051084, filed 6 Sep. 2018, all of which are herein incorporated by reference in their entireties.

BACKGROUND OF THE INVENTION

Field of the Invention

The present invention relates to gang saws. More particularly, the invention relates to apparatus and methods for correcting the misalignment of guide posts in gang saws.

Description of the Related Art

A sawmill, or lumber mill, is used to process logs into lumber. Typically, logs are transported to the sawmill, where they are first broken into cants, which are logs with one or more squared sides. The cants may then be passed through a set of parallel circular saw blades, called a circular gang saw, to produce individual boards.

In a typical gang saw, a plurality of parallel circular saw blades is mounted on a rotating arbor to form a gang saw assembly. A saw guide assembly is provided for each gang saw assembly. The saw guide assembly comprises a plurality of saw guides attached to a guide post. The saw guides and the saw blades are configured such that each saw blade engages the saw guide assembly in between two adjacent saw guides.

Because of the tight clearance between the saw blades and the respective saw guides (measured in thousandths of an inch), it is important that the saw guides and the saw blades be properly aligned with respect to each other. For example, if the guide post becomes misaligned with respect to the gang saw assembly (e.g. through inaccurate boring, normal wear, thermal stresses, inaccurately machined parts, etc.), one or more of the saw guides may become misaligned with respect to the saw blades. This misalignment may result in deviation of the saw blades away from a perpendicular plane relative to the axis of the arbor. This can cause undesired variability in the dimensions of the sawn lumber, as well as the generation of more heat and friction, which in turn may decrease the lifespan of the components.

It is therefore desirable to provide a method and apparatus for adjusting and correcting the alignment of the guide post (and by extension the saw guides) with respect to the gang saw assembly.

BRIEF SUMMARY OF THE INVENTION

In one embodiment of the invention, a levelling apparatus for aligning a plurality of saw guides mounted on a guide post with respect to a plurality of saw blades mounted on an arbor in a gang saw using mounting fasteners comprises a guide manifold, a first wedge portion, a second wedge portion, and a shaft collar.

The guide manifold supports the plurality of saw guides and comprises a manifold channel for accepting the guide post therethrough and a plurality of manifold openings for accepting one or more of the mounting fasteners. The manifold openings are arranged in a circular pattern about a centre of the guide manifold.

The first wedge portion comprises first wedge upper and lower surfaces, wherein the first wedge upper surface is in contact with the guide manifold, wherein the first wedge upper surface is substantially perpendicular to a longitudinal axis of the first wedge portion, and wherein the first wedge lower surface is nonparallel to the first wedge upper surface. The first wedge portion further comprises a first wedge channel for accepting the guide post therethrough and a plurality of first wedge openings for accepting one or more of the mounting fasteners. The first wedge openings are arranged in a spaced, circular pattern about a centre of the first wedge portion, wherein each of the first wedge openings define an angular offset with an adjacent first wedge opening.

The second wedge portion comprises second wedge upper and lower surfaces, wherein the second wedge upper surface is in contact with the first wedge lower surface, wherein the second wedge lower surface is substantially perpendicular to a longitudinal axis of the second wedge portion, and wherein the second wedge upper surface is nonparallel to the second wedge lower surface. The second wedge portion further comprises a second wedge channel for accepting the guide post therethrough and a plurality of second wedge openings for accepting one or more of the mounting fasteners. The second wedge openings correspond to the first wedge openings.

The shaft collar is in contact with the second wedge lower surface and fixedly engaged to the guide post. The shaft collar comprises a plurality of collar openings for accepting one or more of the mounting fasteners, with the collar openings corresponding to the manifold openings.

Rotation of the first wedge portion with respect to the second wedge portion varies an angle between the first wedge upper surface and the second wedge lower surface, thereby allowing for angular alignment of the saw guides with the saw blades. In addition, the manifold openings are arranged such that each manifold opening defines a manifold angular offset with an adjacent one of the manifold openings that is approximately 1.5 times the angular offset. The manifold, the first wedge portion, the second wedge portion, and the shaft collar are fixed in position by the mounting fasteners extending through the manifold openings, the first wedge openings, the second wedge openings, and the collar openings.

In another embodiment, the first wedge openings are evenly spaced.

In yet another embodiment, the first wedge portion comprises 27 first wedge openings.

In a further embodiment, the first wedge upper surface and the first wedge lower surface are angled with respect to each other between approximately 0.075° and 0.3°.

In still a further embodiment, the first wedge upper surface and the first wedge lower surface are angled with respect to each other at approximately 0.15°.

In yet still a further embodiment, the second wedge upper surface and the second wedge lower surface are angled with respect to each other between approximately 0.075° and 0.3°.

In yet another embodiment, the second wedge upper surface and the second wedge lower surface are angled with respect to each other at approximately 0.15°.

In another embodiment, the first wedge upper surface is angled with respect to the first wedge lower surface by a first angle, the second wedge upper surface is angled with respect to the second wedge lower surface by a second angle, and the first angle is substantially equal to the second angle.

In yet another embodiment, the first wedge portion further comprises a first indicator, the second wedge portion further comprises a second indicator, and the first wedge upper surface is substantially parallel to the second wedge lower surface when the first and second indicators are aligned.

In a further embodiment, the first indicator is located on a side of the first wedge portion.

In a still further embodiment, the second indicator is located on a side of the second wedge portion.

In still another embodiment, one or both of the first wedge portion and the second wedge portion comprises position markings on their side.

In yet still another embodiment, the position markings indicate the location of the first or second wedge openings, respectively.

In another embodiment, the position markings are alphanumeric characters.

In yet another embodiment, the levelling apparatus further comprises a retaining ring for supporting the shaft collar.

In still yet another embodiment, the shaft collar comprises first and second collar portions, with the first and second collar portions adapted to fit around the guide post.

In a further embodiment, the first and second collar portions are fixedly engaged around the guide post using one or more collar fasteners.

In yet a further embodiment, the first wedge portion further comprises a counterbored portion formed on the first wedge lower surface around a circumference of the first wedge channel, the second wedge portion further comprises a circular lip extending substantially perpendicularly to the second wedge upper surface around a circumference of the second wedge channel, and the lip is adapted to engage with the counterbored portion.

In another embodiment, a levelling apparatus for aligning a guide manifold with respect to a guide post in a gang saw using mounting fasteners comprises a first wedge portion, a second wedge portion, and a shaft collar. The first wedge portion comprises first wedge upper and lower surfaces, wherein the first wedge upper surface is in contact with the guide manifold, wherein the first wedge upper surface is substantially perpendicular to a longitudinal axis of the first wedge portion, and wherein the first wedge lower surface is nonparallel to the first wedge upper surface. The first wedge portion further comprises a first wedge channel for accepting the guide post therethrough and a plurality of first wedge openings for accepting one or more of the mounting fasteners. The first wedge openings are arranged in a spaced, circular pattern about a centre of the first wedge portion, wherein each of the first wedge openings define an angular offset with an adjacent first wedge opening. The second wedge portion comprises second wedge upper and lower surfaces, wherein the second wedge upper surface is in contact with the first wedge lower surface, wherein the second wedge lower surface is substantially perpendicular to a longitudinal axis of the second wedge portion, and wherein the second wedge upper surface is nonparallel to the second wedge lower surface. The second wedge portion further comprises a second wedge channel for accepting the guide post therethrough and a plurality of second wedge openings for accepting one or more of the mounting fasteners. The second wedge openings correspond to the first wedge openings. The shaft collar is in contact with the second wedge lower surface and is fixedly engaged to the guide post, with the shaft collar comprising a plurality of collar openings for accepting one or more of the mounting fasteners. Rotation of the first wedge portion with respect to the second wedge portion varies an angle between the first wedge upper surface and the second wedge lower surface, thereby allowing for angular alignment of the guide manifold with the guide post. The first wedge portion, the second wedge portion, and the shaft collar are fixed in position by the mounting fasteners extending through the first wedge openings, the second wedge openings, and the collar openings.

The foregoing was intended as a summary only and of only some of the aspects of the invention. It was not intended to define the limits or requirements of the invention. Other aspects of the invention will be appreciated by reference to the detailed description of the preferred embodiments. Moreover, this summary should be read as though the claims were incorporated herein for completeness.

BRIEF DESCRIPTION OF THE DRAWINGS

The invention will be described by reference to the following drawings thereof, in which.

DETAILED DESCRIPTION OF THE INVENTION

Figure 1:
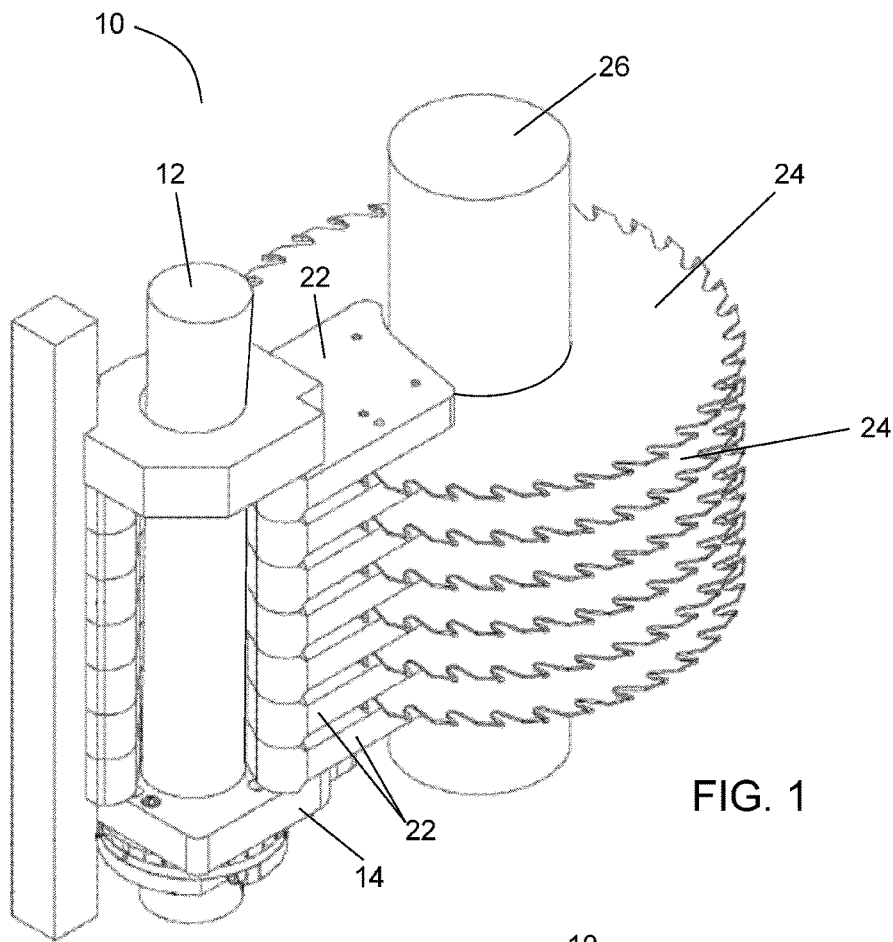
FIG. 1 is a perspective view of a saw guide assembly and saw blades in accordance with the present invention.

Referring to FIGS. 1 to 4, a saw arbor guide assembly 10 in accordance with the present invention comprises a substantially cylindrical guide post 12 mounted to a guide manifold 14. The guide manifold 14 comprises upper and lower manifold surfaces 16, 18, with a substantially circular manifold channel 20 extending between the upper and lower manifold surfaces 16, 18. Preferably, the manifold channel 20 is sized to accept the guide post 12 therethrough.

A plurality of saw guides 22 are placed, generally in a stacked configuration, on the upper manifold surface 16 and are mounted to the guide post 12. The saw guides 22 are arranged to engage with a plurality of saw blades 24 that are attached to a rotating arbor 26 during operation.

Figure 5:
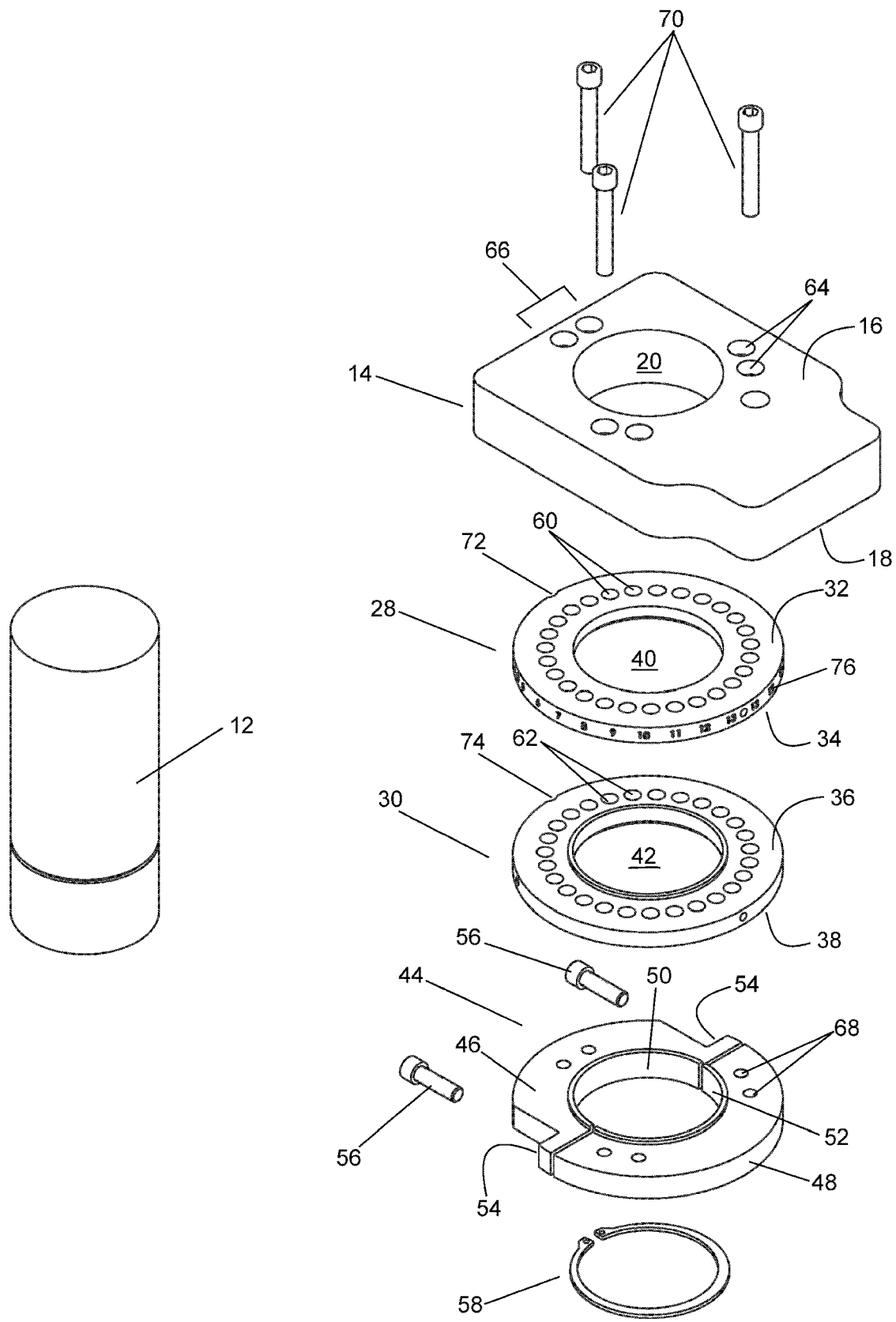
FIG. 5 is a partial exploded view of the saw guide assembly of FIG. 1.
Figure 6:
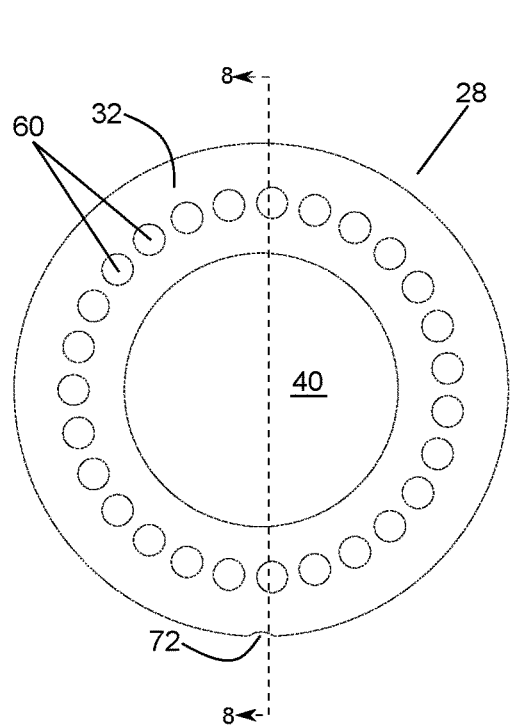
FIG. 6 is a top view of the first wedge portion of the saw guide assembly.
Figure 7:
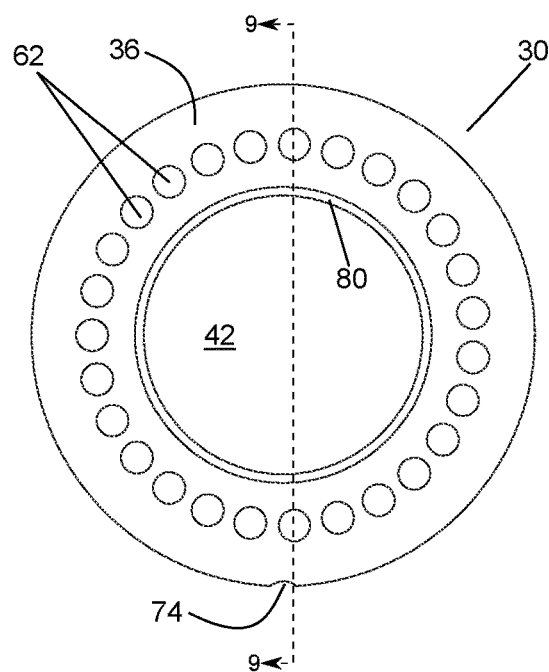
FIG. 7 is a top view of the second wedge portion of the saw guide assembly.

Referring to FIG. 5, the saw arbor guide assembly 10 further comprises first and second wedge portions 28, 30. The first wedge portion 28 comprises first wedge upper and lower surfaces 32, 34, while the second wedge portion 30 comprises second wedge upper and lower surfaces 36, 38. The first wedge portion 28 further comprises a substantially circular first wedge channel 40 extending between the first wedge upper surface 32 and the first wedge lower surface 34. The second wedge portion 30 further comprises a substantially circular second wedge channel 42 extending between the second wedge upper surface 36 and the second wedge lower surface 38. Both the first and second wedge channels 40, 42 are preferably sized to accept the guide post 12 therethrough.

Figure 2:
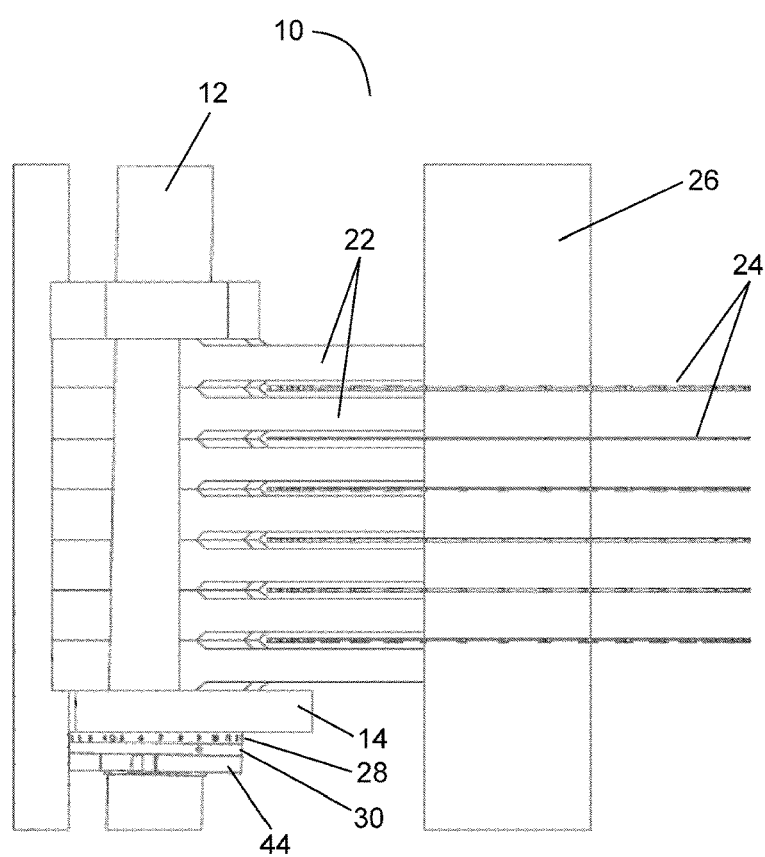
FIG. 2 is a side view of FIG. 1.
Figure 3:
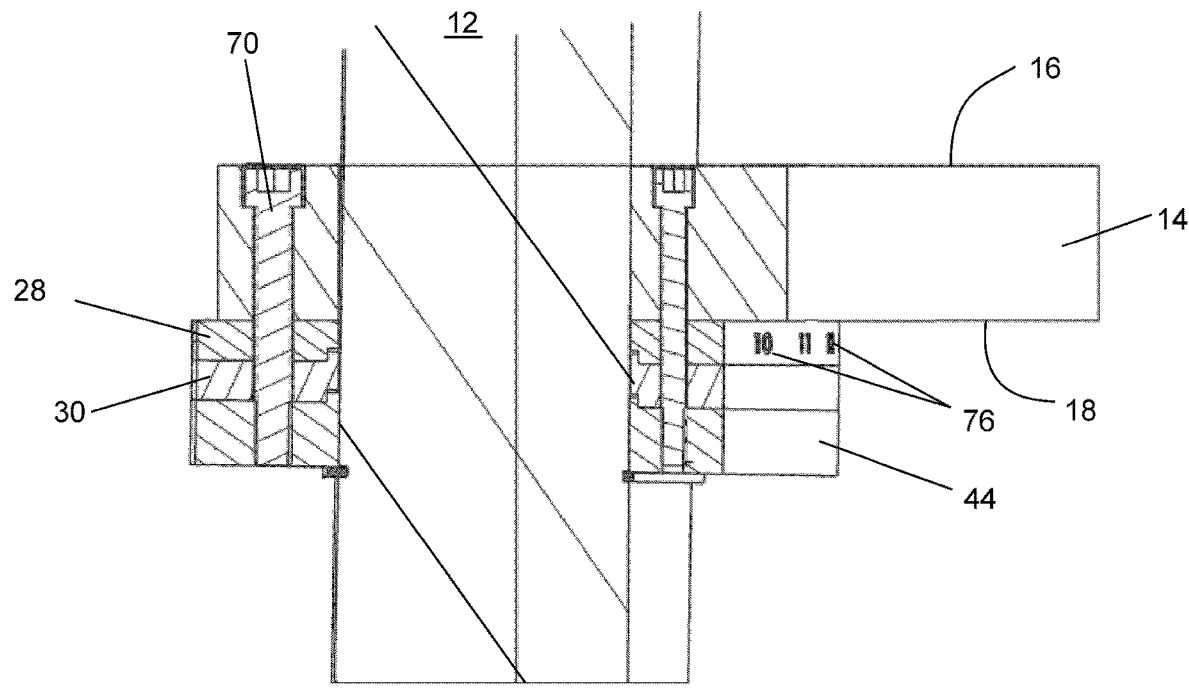
FIG. 3 is a cross-sectional partial view of FIG. 2.
Figure 10:
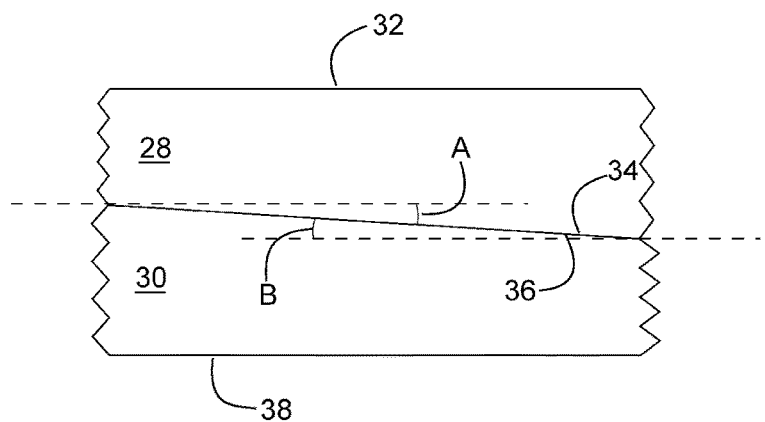
FIG. 10 is a partial view of the first wedge portion on the second wedge portion in one orientation.
Figure 11:
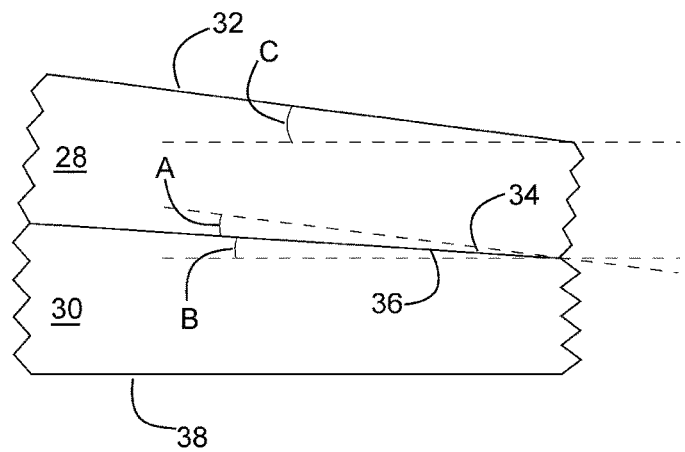
FIG. 11 is a partial view of the first wedge portion on the second wedge portion in another orientation.

Referring to FIGS. 2 and 3, the first and second wedge portions 28, 30 are arranged such that the first wedge upper surface 32 is in contact with the lower manifold surface 18, and the first wedge lower surface 34 is in contact with the second wedge upper surface 36. The first and second wedge portions 28, 30 are each somewhat cylindrical in shape, but they are not perfectly cylindrical (as best shown in FIGS. 10 and 11). In particular, with respect to the first wedge portion 28, while the first wedge upper surface 32 is substantially perpendicular to the longitudinal axis of the first wedge portion 28, the first wedge lower surface 34 is not (i.e. the first wedge lower surface 34 is not parallel to the first wedge upper surface 32). The first wedge lower surface 34 is at an angle A with respect to the first wedge upper surface 32. The angle A is preferably between 0.075° and 0.3°, although other angles are also possible. In one embodiment, the angle A may be 0.15°.

With respect to the second wedge portion 30, while the second wedge lower surface 38 is substantially perpendicular to the longitudinal axis of the second wedge portion 30, the second wedge upper surface 36 is not (i.e. the second wedge upper surface 36 is not parallel to the second wedge lower surface 38). The second wedge upper surface 36 is at an angle B with respect to the second wedge lower surface 38. The angle B is preferably between 0.075° and 0.3°, although other angles are also possible. In one embodiment, the angle B may be 0.15°.

In other words, the two surfaces of the first and second wedge portions 28, 30 that are in contact with each other (i.e. the first wedge lower surface 34 and the second wedge upper surface 36) are not substantially perpendicular to the longitudinal axes of their respective wedge portions 28, 30 but are instead slightly angled. Preferably, the angles A and B are identical, but they do not necessarily have to be so. Because of the angled nature of the first wedge lower surface 34 and the second wedge upper surface 36, any rotation of the first wedge portion 28 with respect to the second portion 30 will result in a change in the angularity of the first wedge upper surface 32 with respect to the second wedge lower surface 38.

Figure 4:
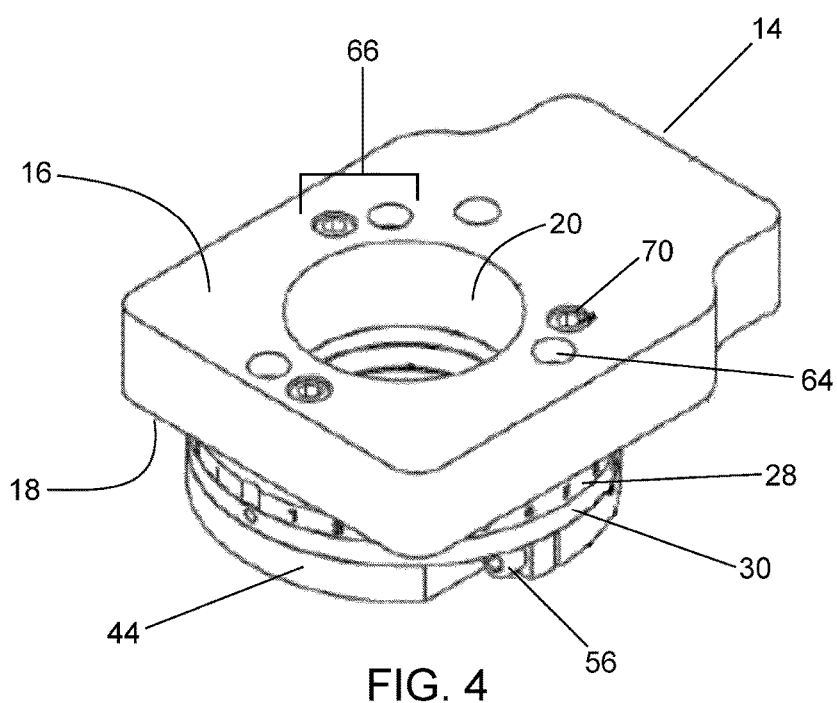
FIG. 4 is a partial perspective view of the saw guide assembly of FIG. 1.

Referring to FIGS. 3 to 5, the saw arbor guide assembly 10 further comprises a shaft collar 44 installed on the guide post 12. The shaft collar 44 is in contact with the second wedge lower surface 38 and comprises first and second collar portions 46, 48. The first collar portion 46 comprises a first semicircular surface 50 while the second collar portion 48 comprises a second semicircular surface 52. The first and second collar portions 46, 48 are configured to fit around the guide post 12 with the first and second semicircular surfaces 50, 52 contacting the outer surface of the guide post 12. Preferably, both the first and second collar portions 46, 48 comprise collar attachment openings 54 for receiving collar fasteners 56. The collar fasteners 56 may be used to fixedly secure the first and second collar portions 46, 48 together about the guide post 12. Suitable collar fasteners 56 include screws, bolts, and the like.

The saw arbor guide assembly 10 may also comprise a retaining ring 58 for supporting the shaft collar 44.

Referring to FIGS. 6 to 9, the mechanism for adjusting the alignment of the guide post 12 will now be described. The first wedge portion 28 comprises a plurality of first wedge openings 60 spaced in a circular pattern about a centre of the first wedge channel 40. The first wedge openings 60 extend through the entire height of the first wedge portion 28 (i.e. they extend from the first wedge upper surface 32 to the first wedge lower surface 34). In the embodiment shown in FIG. 5, there are 27 such first wedge openings 60 evenly spaced apart from each other. As there are 360° in a circle, the 27 first wedge openings 60 are spaced approximately 13⅓° from each other. It is understood that a different number of first wedge openings 60 may also be used.

The second wedge portion 30 also comprises a plurality of second wedge openings 62 spaced in a circular pattern about a centre of the second wedge channel 42. The second wedge openings 62 extend through the entire height of the second wedge portion 30 (i.e. they extend from the second wedge upper surface 36 to the second wedge lower surface 38). Preferably, the number, size, and location of the second wedge openings 62 correspond to those of the first wedge openings 60 such that when the first wedge portion 28 and the second wedge portion 30 are placed on top of each other, the first and second wedge openings 60, 62 are aligned.

Referring to FIG. 5, the guide manifold 14 further comprises a plurality of manifold openings 64 that extend from the upper manifold surface 16 to the lower manifold surface 18 (i.e. they extend for the entire height of the guide manifold 14). In the embodiment shown in FIG. 5, there are three groupings 66 of two manifold openings 64 each (for a total of six) that are arranged in a generally circular pattern about a centre of the manifold channel 20. Preferably, the groupings 66 are arranged such that they are approximately evenly spaced apart from each other. The size and location of the manifold openings 64 are preferably such that when the guide manifold 14 is placed on top of the first and second wedge portions 28, 30, at least one of the manifold openings 64 in each of the groupings 66 align with one of the first and second wedge openings 60, 62. Preferably, the angular offset between the two manifold openings 64 in each of the three groupings 66 is equal to approximately 1.5 times the angular offset between adjacent first wedge openings 60. In the embodiment shown in FIG. 5, where the angular offset between adjacent first wedge openings 60 is approximately 13⅓°, the angular offset between the two manifold openings 64 in each of the three groupings 66 is preferably approximately 20°.

The shaft collar 44 further comprises a plurality of collar openings 68. Preferably, the number, size, and location of the collar openings 68 correspond to those of the manifold openings 64 such that when the guide manifold 14 and the first and second wedge portions 28, 30 are placed on top of the shaft collar 44, the collar openings 68 align with the manifold openings 64.

The first wedge openings 60, the second wedge openings 62, the manifold openings 64, and the collar openings 68 are preferably sized to accept a mounting fastener 70. The mounting fastener 70 may be a bolt, screw, or the like. In the embodiment shown in FIG. 5, three mounting fasteners 70 are used, one in each grouping 66.

Because of the angles A, B, any rotation of the first wedge portion 28 with respect to the second wedge portion 30 will cause the angularity between the first wedge upper surface 32 and the second wedge lower surface 38 to change. For example, if the angle A is identical to the angle B, an angle C between the first wedge upper surface 32 and the second wedge lower surface 38 may be anywhere between 0° and (A+B)°. For example, where the angles A, B are approximately 0.15°, the range for the angle C would be between 0° and approximately 0.3°.

In order to achieve 0° for the angle C, the first and second wedge portions 28, 30 would have to be oriented in such a manner that the slopes of the first wedge lower surface 34 and the second wedge upper surface 36 are aligned in opposite directions, as shown in FIG. 10. In this orientation, the first wedge upper surface 32 and the second wedge lower surface 38 would be substantially parallel to each other. In order to more easily locate this orientation, the first wedge portion 28 preferably comprises a first wedge indicator 72 and the second wedge portion 30 preferably comprises a second wedge indicator 74. The first and second wedge indicators 72, 74 may be a notch formed on the sides of the first and second wedge portions 28, 30, respectively. When the first and second wedge portions 28, 30 are oriented such that the first wedge upper surface 32 and the second wedge lower surface 38 are substantially parallel to each other, the first and second wedge indicators 72, 74 preferably are aligned. In addition, one or both of the first wedge portion 28 and the second wedge portion 30 may comprise position markings 76 (e.g. numerical or alphanumeric markings) on its side to help identify the location of the first wedge openings 60 or the second wedge openings 62. In the embodiment shown in FIG. 5, the position markings 76 are found on the first wedge portion 28 only.

In order to achieve the maximum degree of angularity for the angle C, the first wedge portion 28 would have to be oriented 180° from the above described orientation, as shown in FIG. 11. In this orientation, the first and second wedge indicators 72, 74 would be located 180° from each other. When the first wedge portion 28 and the second wedge portion 30 are oriented at other angles, the angle C will correspondingly change.

By providing the first and second wedge openings 60, 62, the degree of angularity between the first wedge upper surface 32 and the second wedge lower surface 38 can be adjusted in a discrete fashion. Because the guide manifold 14 is located on the first wedge upper surface 32, any rotation of the first wedge portion 28 with respect to the second wedge portion 30 will also cause the angularity between the upper manifold surface 16 and the second wedge lower surface 38 to change. In this manner, the angular orientation of the guide manifold 14 may be adjusted. Similarly, as the saw guides 22 are generally in a stacked configuration on top of the upper manifold surface 16, any adjustment of the angularity of the guide manifold 14 will also cause the angularity of the saw guides 22 with respect to the second wedge lower surface 38 to change, thereby affecting the overall angularity of the saw guides 22.

The steps involved in adjusting the orientation of the saw guides 22 will now be described. The retaining ring 58 is first placed onto the guide post 12. Next, the first and second collar portions 46, 48 are placed around the guide post 12, on top of the retaining ring 58. The collar fasteners 56 may be inserted into the collar attachment openings 54 to connect the first and second collar portions 46, 48 together; however, the first and second portions 46, 48 should not be fixedly attached to the guide post 12 at this time. In other words, the shaft collar 44 should be around the guide post 12 but still freely rotatable about it.

The second wedge portion 30, the first wedge portion 28, and the guide manifold 14 can then be inserted around the guide post 12 (in that order) on top of the shaft collar 44. Initially, the first and second wedge portions 28, 30 can be oriented such that the first and second wedge indicators 72, 74 are aligned. This will ensure that the guide manifold 14 is substantially parallel to the shaft collar 44.

In this orientation, the first and second wedge openings 60, 62 should be already aligned. The shaft collar 44 and the guide manifold 14 can be rotated about the guide post 12 until the collar openings 68 and the manifold openings 64 are aligned with each other. The first and second wedge portions 28, 30 can also be rotated (together) about the guide post 12 until one of the manifold openings 64 in each grouping 66 is aligned with one of the first and second wedge openings 60, 62. When this is achieved, the mounting fasteners 70 may be inserted through the aligned manifold openings 64, first and second wedge openings 60, 62, and collar openings 68. At this point, the guide manifold 14, the first and second wedge portions 28, 30, and the shaft collar 44 should be connected together. This assembly can be rotated together about the guide post 12 until a suitable location on the guide post 12 is found. The collar fasteners 56 can be tightened to fixedly secure the shaft collar 44 onto the guide post 12. Depending on the specifications of the collar fasteners 56, the degree of torque required to secure the shaft collar 44 onto the guide post 12 may vary.

Figure 12:
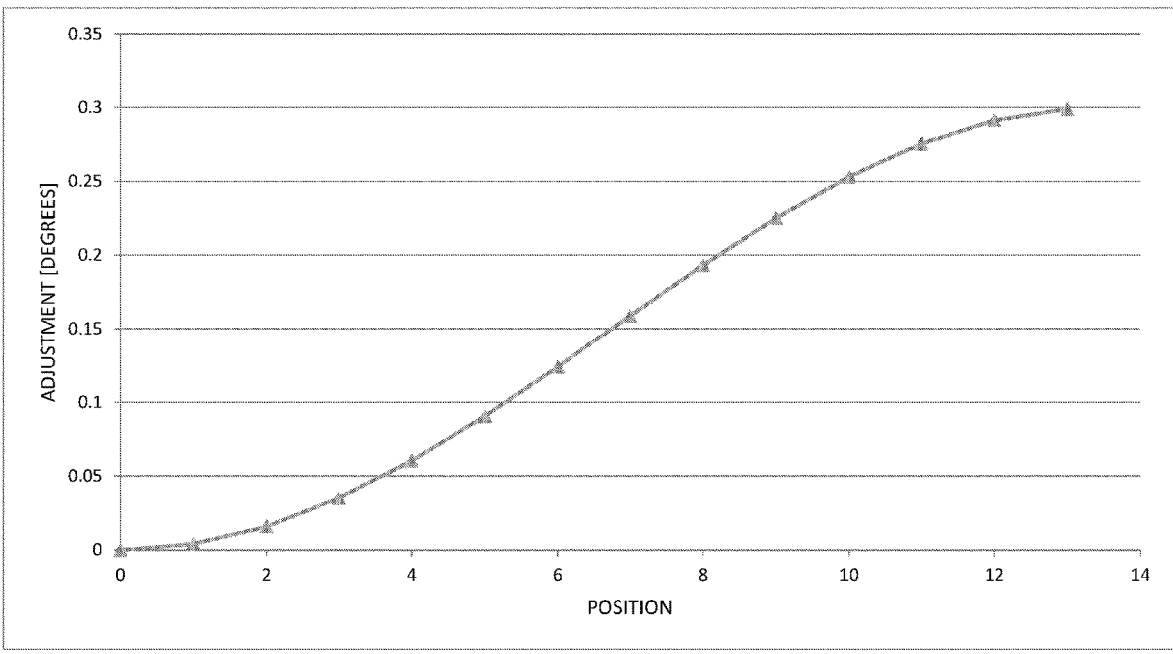
FIG. 12 is a graph showing the degree of angular adjustment with respect to the position markings on the first wedge portion.

With the shaft collar 44 secured to the guide post 12, the mounting fasteners 70 may be removed. At this point, it will be necessary to measure the misalignment, if any, of the guide post 12. This may be done by using a precision level to measure the levelness of the upper manifold surface 16 at various locations thereon. As the levelness of the upper manifold surface 16 may vary at different locations, choose the highest recorded angle. This angle can be compared with a chart (such as that shown in FIG. 12) that sets out the angular adjustment corresponding to the different position markings 76 on the first wedge portion 28. For a particular angle, choose the position marking 76 that corresponds to slightly higher than that angle. This position marking 76 should then be used to rotate the first wedge portion 28 about the guide post 12 until the second wedge indicator 74 is aligned with the chosen position marking 76 on the first wedge portion 28.

With the relative orientation of the first and second wedge portions 28, 30 determined, the two wedge portions 28, 30 can be rotated together until the upper manifold surface 16 is determined to be substantially level. The two wedge portions 28, 30 can then be rotated slightly (in either direction) until one of the manifold openings 64 in each grouping 66 is aligned with one of the first and second wedge openings 60, 62 and with the collar openings 68. Preferably, the two wedge portions 28, 30 should be rotated the minimal distance necessary to achieve such alignment. The mounting fasteners 70 can then be inserted through the manifold openings 64, the first and second wedge openings 60, 62, and the collar openings 68 and tightened to fix the assembly in place. Depending on the specifications of the mounting fasteners 70, the degree of torque required to fix the assembly in place may vary.

In the embodiment shown in FIG. 5, by providing two manifold openings 64 in each of the grouping 66, an additional moment of adjustment is possible. In particular, by arranging the angular offset of the manifold openings 64 to be 1.5 times the angular offset of the first wedge openings 60, angular adjustments that are half of the angular offset of the first wedge portions 60 are possible.

Figures 8, 9:
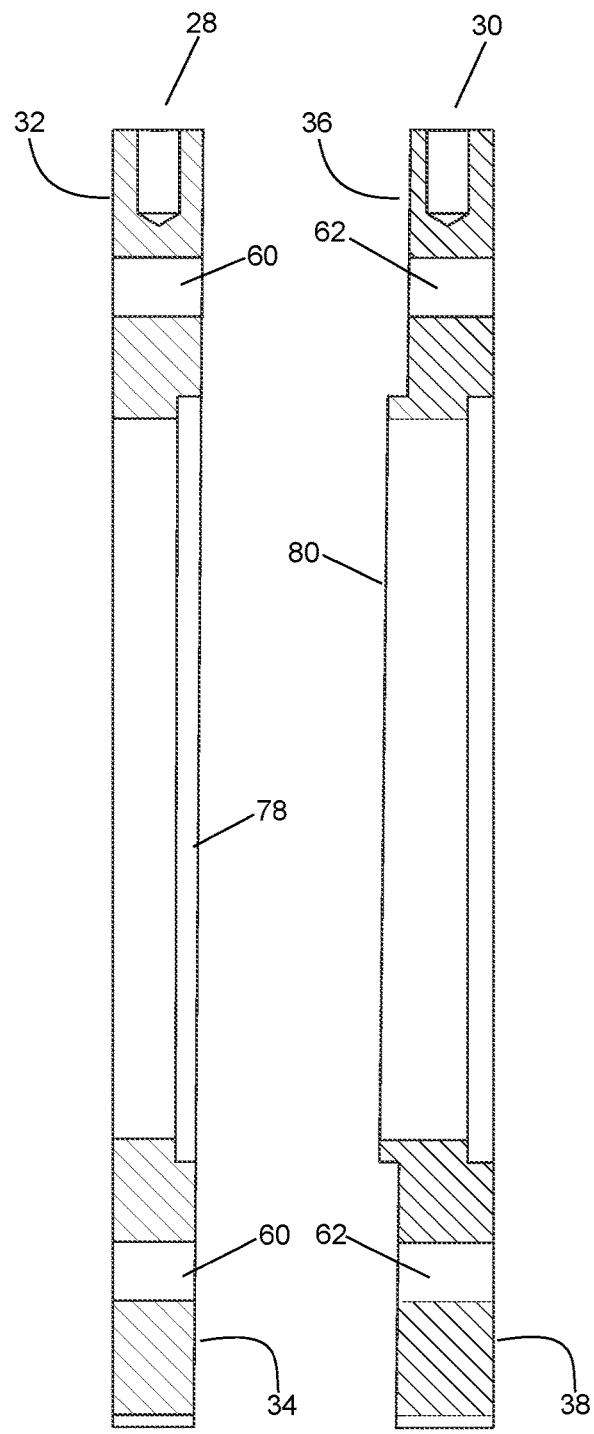
FIG. 8 is a cross-sectional view of FIG. 6, taken along line 8-8.
FIG. 9 is a cross-sectional view of FIG. 7, taken along line 9-9.

Preferably, as shown in FIG. 8, the first wedge portion 28 comprises a circular counterbored portion 78 formed on the first wedge lower surface 34 around the circumference of the first wedge channel 40. The counterbored portion 78 comprises an enlarged opening to the first wedge channel 40. As shown in FIG. 9, the second wedge portion 30 preferably comprises a corresponding circular lip 80 extending substantially perpendicular to the second wedge upper surface 36 around the circumference of the second wedge channel 42. When the first and second wedge portions 28, 30 are placed together, the lip 80 fits within the counterbored portion 78. This engagement of the lip 80 and the counterbored portion 78 prevents any slippage of the first wedge portion 28 with respect to the second wedge portion 30 (such as under heavy loads) and also allows for smooth rotation of the first wedge portion 28 with respect to the second wedge portion 30.

It will be appreciated by those skilled in the art that the preferred embodiment has been described in some detail but that certain modifications may be practiced without departing from the principles of the invention.

What is claimed is:

1. A levelling apparatus for use in a gang saw for aligning a plurality of saw guides mounted on a guide post, the levelling apparatus comprising:
   a guide manifold adapted to support thereon the plurality of saw guides, the guide manifold comprising:
      a manifold channel adapted to accept the guide post therethrough; and
      a plurality of manifold openings, wherein the plurality of manifold openings arranged about the manifold channel;
   a first wedge portion comprising:
      first wedge upper surface and first wedge lower surface, wherein the first wedge upper surface is in contact with the guide manifold, and wherein the first wedge lower surface is nonparallel to the first wedge upper surface;
      a first wedge channel adapted to accept the guide post therethrough; and
      a plurality of first wedge openings arranged in a circular pattern about the first wedge channel;
   a second wedge portion comprising:
      second wedge upper surface and second wedge lower surface, wherein the second wedge upper surface is in contact with the first wedge lower surface, and wherein the second wedge upper surface is nonparallel to the second wedge lower surface; and
      a second wedge channel adapted to accept the guide post therethrough; and
      a plurality of second wedge openings arranged in a circular pattern about the second wedge channel;
      a circular lip formed on the second wedge upper surface, the circular lip adapted to engage with the first wedge portion; and
   one or more mounting fasteners adapted to extend through one or more of the plurality of first wedge openings and the plurality of second wedge openings to releasably secure the first wedge portion to the second wedge portion;
   wherein the plurality of manifold openings are adapted to accept at least one of the one or more mounting fasteners;
   wherein angular alignment of the guide manifold is set by selecting, prior to securing the first wedge portion to the second wedge portion by the one or more mounting fasteners, a rotational orientation of the first wedge portion to define an angle between the first wedge upper surface and the second wedge lower surface;
   wherein the plurality of manifold openings are arranged in pairs such that a first manifold opening in a pair defines a manifold angular offset with a second manifold opening in the pair that is 1.5 times the manifold angular offset.

2. The levelling apparatus of claim 1, wherein the plurality of first wedge openings are evenly spaced.

3. The levelling apparatus of claim 1, wherein the first wedge portion comprises 27 first wedge openings.

4. The levelling apparatus of claim 1, wherein the first wedge upper surface and the first wedge lower surface are angled with respect to each other between 0.075° and 0.3°.

5. The levelling apparatus of claim 4, wherein the first wedge upper surface and the first wedge lower surface are angled with respect to each other at 0.15°.

6. The levelling apparatus of claim 1, wherein the second wedge upper surface and the second wedge lower surface are angled with respect to each other between 0.075° and 0.3°.

7. The levelling apparatus of claim 6, wherein the second wedge upper surface and the second wedge lower surface are angled with respect to each other at 0.15°.

8. The levelling apparatus of claim 1, wherein the first wedge upper surface is angled with respect to the first wedge lower surface by a first angle, wherein the second wedge upper surface is angled with respect to the second wedge lower surface by a second angle, and wherein the first angle is equal to the second angle.

9. The levelling apparatus of claim 1, wherein the first wedge portion further comprises a first indicator, wherein the second wedge portion further comprises a second indicator, and wherein the first wedge upper surface is parallel to the second wedge lower surface when the first indicator and the second indicator are aligned.

10. The levelling apparatus of claim 9, wherein the first indicator is located on a side of the first wedge portion.

11. The levelling apparatus of claim 9, wherein the second indicator is located on a side of the second wedge portion.

12. The levelling apparatus of claim 1, wherein each of the first wedge portion and the second wedge portion comprises a side surface, and wherein one or both of the first wedge portion and the second wedge portion comprises position markings on the side surface.

13. The levelling apparatus of claim 12, wherein the position markings on the first wedge portion and the second wedge portion indicate a location of the plurality of first wedge openings or the plurality of second wedge openings, respectively.

14. The levelling apparatus of claim 13, wherein the position markings are alphanumeric characters.

15. The levelling apparatus of claim 1 further comprising a shaft collar in contact with the second wedge lower surface and fixedly engaged to the guide post, the shaft collar comprising a plurality of collar openings adapted to accept at least one of the one or more mounting fasteners, the plurality of collar openings corresponding to the plurality of manifold openings.

16. The levelling apparatus of claim 15 further comprising a retaining ring adapted to support the shaft collar.

17. The levelling apparatus of claim 15, wherein the shaft collar comprises first and second collar portions, the first and second collar portions adapted to fit around the guide post.

18. The levelling apparatus of claim 17, wherein the first and second collar portions are adapted to be fixedly engaged around the guide post.

19. The levelling apparatus of claim 1, wherein the first wedge portion further comprises a counterbored portion formed on the first wedge lower surface around a circumference of the first wedge channel, wherein the circular lip extends perpendicularly to the second wedge upper surface around a circumference of the second wedge channel, and wherein the circular lip is further adapted to engage with the counterbored portion.

* * * * *